United States Patent
Kim et al.

(10) Patent No.: US 8,161,296 B2
(45) Date of Patent: Apr. 17, 2012

(54) METHOD AND APPARATUS FOR MANAGING DIGITAL CONTENT

(75) Inventors: Myung-sun Kim, Uiwang-si (KR); Young-sun Yoon, Suwon-si (KR); Sun-nam Lee, Suwon-si (KR); Bong-seon Kim, Seongnam-si (KR); Jae-heung Lee, Suwon-si (KR); Sung-hyu Han, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1663 days.

(21) Appl. No.: 11/410,029

(22) Filed: Apr. 25, 2006

(65) Prior Publication Data
US 2006/0253398 A1      Nov. 9, 2006

Related U.S. Application Data

(60) Provisional application No. 60/674,333, filed on Apr. 25, 2005, provisional application No. 60/739,439, filed on Nov. 25, 2005.

(30) Foreign Application Priority Data

Jul. 20, 2005 (KR) .......... 10-2005-0065669
Dec. 23, 2005 (KR) .......... 10-2005-0128708

(51) Int. Cl.
*G06F 21/00* (2006.01)
(52) U.S. Cl. .......... 713/193; 713/176; 713/187; 380/30; 380/200; 380/242
(58) Field of Classification Search .......... 713/171, 713/165–167, 153; 380/277
See application file for complete search history.

(56) References Cited

U.S. PATENT DOCUMENTS

| | | | |
|---|---|---|---|
| 5,513,260 A * | 4/1996 | Ryan | 380/200 |
| 6,442,688 B1 | 8/2002 | Moses et al. | |
| 7,010,125 B2 * | 3/2006 | Lotspiech et al. | 380/242 |
| 2002/0035685 A1 * | 3/2002 | Ono et al. | 713/155 |
| 2002/0150097 A1 | 10/2002 | Yen et al. | |
| 2003/0076955 A1 | 4/2003 | Alve et al. | |
| 2003/0133576 A1 | 7/2003 | Grumiaux et al. | |

(Continued)

FOREIGN PATENT DOCUMENTS

JP      11-196082 A      7/1999

(Continued)

OTHER PUBLICATIONS

USPTO Non-Final Office Action dated Oct. 26, 2009 issued in co-pending U.S. Appl. No. 11/410,033.

(Continued)

*Primary Examiner* — Taghi Arani
*Assistant Examiner* — Gregory Lane
(74) *Attorney, Agent, or Firm* — Sughrue Mion, PLLC

(57) ABSTRACT

A method and apparatus for managing digital content, which can detect the leakage of an encryption key when the encryption key used for encrypting the digital content is leaked or cracked. When the encrypted digital content is decrypted by an illegal device, a module linked with the encrypted digital content is automatically driven and a digital content managing apparatus is then notified that the encrypted digital content has been decrypted by the illegal device such that the digital content managing apparatus can change the encryption key. Thus, it is possible to prevent the digital content from being continuously leaked due to the use of the same encryption key for encrypting subsequent digital content.

21 Claims, 6 Drawing Sheets

U.S. PATENT DOCUMENTS

| | | |
|---|---|---|
| 2003/0149854 A1 | 8/2003 | Yoshino et al. |
| 2005/0071639 A1* | 3/2005 | Rodgers et al. ............... 713/176 |
| 2005/0141720 A1 | 6/2005 | Watanabe et al. |
| 2005/0193199 A1 | 9/2005 | Asokan et al. |
| 2009/0019288 A1 | 1/2009 | De Castro et al. |

FOREIGN PATENT DOCUMENTS

| | | | |
|---|---|---|---|
| JP | 11220463 A | | 8/1999 |
| JP | 11266241 A | | 9/1999 |
| JP | 2000-125360 A | | 4/2000 |
| JP | 202217890 A | | 8/2002 |
| JP | 2002217888 A | | 8/2002 |
| JP | 2002314532 A | | 10/2002 |
| JP | 200387232 A | | 3/2003 |
| JP | 2004512734 A | | 4/2004 |
| JP | 2004-192639 A | | 7/2004 |
| KR | 10-2002-0076470 A | | 10/2002 |
| KR | 10-2005-0007830 A | | 1/2005 |
| WO | WO 99/19822 | * | 4/1999 |
| WO | WO9919822 | * | 4/1999 |
| WO | 01/22661 A2 | | 3/2001 |
| WO | 01/65545 A2 | | 9/2001 |
| WO | WO 01/95206 A1 | | 12/2001 |
| WO | WO 0233883 A2 | | 4/2002 |
| WO | WO 02/086725 A1 | | 10/2002 |
| WO | WO 03094422 A1 | | 11/2003 |
| WO | WO 2004/070612 A1 | | 8/2004 |
| WO | WO 2004/077301 A1 | | 9/2004 |
| WO | WO2005069295 | * | 12/2004 |
| WO | WO2005069295 | * | 5/2005 |

OTHER PUBLICATIONS

Communication issued Jul. 6, 2010 by the Canadian Patent Office in counterpart Canadian Application No. 2,603,018.

Communication issued by Canadian Intellectual Property Office on Mar. 2, 2011 in counterpart Canadian Application No. 2,603,018.

Office Action dated Aug. 13, 2010 from the Government of India Patent Office in counterpart Indian application No. 1624/mumnp/2007.

Office Action dated Aug. 8, 2011 from the Government of India Patent Office in counterpart Indian application No. 1624/mumnp/2007.

Hardjono et al. "Secure and Scalable Inter-Domain Group Key Management for N-to-N Multicast." Proceedings of 1998 International Conference on Parallel and Distributed Systems, 1998, pp. 478-485.

Hardjono et al. "An Approach to Key Management and Inter-Domain Authentication in the Telecommunications Management Network." Global Telecommunications Conference, including a Communications Theory Mini-Conference. Technical Program Conference Record, IEEE in Houston. GLOBECOM '93, IEEE. 1993, pp. 171-176.

Chang et al. "Key Management for Secure Internet Multicast using Boolean Function Minimization Techniques." IBM T.J. Watson Center, 1999, pp. 1-10.

Anzai, J. et. al. "Clone Discovery Scheme Using Random Numbers (1)", Proceedings of the 2001 Symposium on Cryptography and Information Security, vol. I of II, 2001, pp. 189-194.

Anzai, J. et. al. "Clone Discovery Scheme Using Random Numbers (3)", The Intsitute of Electronics Information and Communication Engineers, Technical Report of IEIC8, 2001, pp. 29-36.

Anzai, J. et. al. "Clone Discovery Scheme Using Random Numbers (4)" The Institute of Electronics Information and Communication Engineers, Technical Report of IBIC8, 2001, pp. 117-124.

Communication issued on Feb. 14, 2012 by the Japanese Patent Office in the counterpart Japanese Patent Application No. 2008-507561.

Matsuzaki, N. et. al. "Clone Discovery Scheme Using Random Numbers (2)", Proceedings of the 2001 Symposium on Crytography and Information Security, vol. I of II, 2001, pp. 195-200.

* cited by examiner

METHOD AND APPARATUS FOR MANAGING DIGITAL CONTENT

CROSS-REFERENCE TO RELATED PATENT APPLICATION

This application claims the benefit of U.S. Provisional Application Nos. 60/674,333 and 60/739,439, filed on Apr. 25, 2005 and Nov. 25, 2005, respectively, in the U.S. Patent and Trademark Office, and Korean Patent Application Nos. 10-2005-0065669 and 10-2005-0128708, filed on Jul. 20, 2005 and Dec. 23, 2005, respectively, in the Korean Intellectual Property Office, the disclosures of which are incorporated herein in their entirety by reference.

BACKGROUND OF THE INVENTION

1. Field of the Invention

Methods and apparatuses consistent with the present invention relate to managing digital content, and more particularly, to managing digital content to prevent the digital content from being further leaked when an encryption key of the digital content is leaked.

2. Description of the Related Art

Recently, transmission of digital content using various communication media such as the Internet, ground waves, cables, and satellites has rapidly increased, and the sale and lending of the digital content using mass recording media such as compact discs and digital versatile discs (DVDs) has also rapidly increased. Accordingly, digital rights management, which is a means for protecting copyright of digital content has been spotlighted. In particular, research into allowing a legal user of a home domain to freely receive various content services using devices belonging to the home domain is actively ongoing. These devices such as digital televisions or personal digital assistants (PDAs) belonging to the same domain share their content with the other devices.

However, in order to ideally protect the content, only devices which are registered in the domain, can use the content in the domain, and devices which are not registered in the domain cannot use the content in the domain. Accordingly, the devices which are registered in the domain share a domain key. Hereinafter, this domain key will be described in detail.

FIG. 1 is a view for illustrating a method of managing digital content in a general domain. As illustrated in FIG. 1, a domain X includes a device A, a device B, and a device C as domain members. A domain managing apparatus manages these devices A, B, and C. When digital content C is input to the domain X, the domain managing apparatus encrypts the digital content C using a specific encryption key K and transmits encrypted digital content E(K, C) to the devices A, B, and C according to the requests of the devices A, B, and C.

Meanwhile, the devices A, B, and C previously receive a domain key from the domain managing apparatus. The encryption key K used for encrypting the digital content C can be decrypted only by the domain key. In a symmetric key, the domain key is identical to the encryption key. Thus, the digital content C can be shared among the members of the domain X. In other words, although a device which is not registered in the domain X, can receive the encrypted digital content E(K, C), the device cannot decrypt the received E(K, C) because the device does not have the domain key.

However, when the domain key is leaked and the domain managing apparatus does not detect the leakage of the domain key, the digital content input to the domain may be leaked. In other words, when the domain key is leaked or cracked to decrypt the encrypted digital content E(K, C) and the domain managing apparatus does not detect the leakage of the domain key, the digital content, which will be input to the domain X later, may be encrypted using the domain key, and the encrypted digital content E(K, C) may be then decrypted. Thus, the digital content, which must be shared in only the domain, cannot be protected. In addition, this problem may be caused even when digital content used only in a specific device is encrypted using a unique encryption key of the device.

SUMMARY OF THE INVENTION

The present invention provides a method and apparatus for managing digital content, which can detect the leakage of an encryption key when the encryption key used for encrypting the digital content is leaked.

According to an aspect of the present invention, there is provided a method of managing digital content, the method including: determining whether encrypted digital content, which can be decrypted by a first domain key shared by devices which are members of a domain, has been decrypted by a device which is not a member of the domain; generating a second domain key if it is determined that the encrypted digital content has been decrypted by a device which is not a member of the domain; and providing the second domain key to the members of the domain.

According to another aspect of the present invention, there is provided a method of managing digital content shared in a domain, including encrypting the digital content such that the digital content is decrypted only by a domain key shared by members of the domain; generating a module which determines whether the encrypted digital content has been decrypted by a device which is not a member of the domain and notifies the domain of the determined result; and linking the encrypted digital content with the module such that the module is automatically driven when the encrypted digital content is decrypted.

Here, the method may further include generating another domain key when the module notifies that the encrypted digital content has been decrypted by a device which is not a member of the domain; and notifying the members of the domain of the generated domain key.

According to another aspect of the present invention, there is provided a computer-readable medium having embodied thereon a computer program for performing the method of managing the digital content.

According to another aspect of the present invention, there is provided an apparatus for managing digital content shared in a domain, including an encryption unit which encrypts the digital content such that the digital content is decrypted only by a domain key shared by members of the domain; a module generating unit which generates a module for determining whether the encrypted digital content has been decrypted by a device which is not a member of the domain and notifying the domain of the determined result; and a link unit which links the encrypted digital content with the module such that the module is automatically driven when the encrypted digital content is decrypted.

Here, the apparatus may further include a domain key generating unit which generates another domain key when the module notifies that the encrypted digital content has been decrypted by a device which is not a member of the domain; and a notification unit which notifies the members of the domain of the generated domain key.

According to another aspect of the present invention, there is provided a method of managing digital content in a first device, including encrypting the digital content using an encryption key corresponding to a unique decryption key of the first device; generating a module which determines whether the encrypted digital content has been decrypted by a second device and notifies the first device of the determined result; and linking the encrypted digital content with the module such that the module is automatically driven when the encrypted digital content is decrypted.

According to another aspect of the present invention, there is provided a computer-readable medium having embodied thereon a computer program for performing the method of managing the digital content.

According to another aspect of the present invention, there is provided an apparatus for managing digital content, including an encryption unit which encrypts the digital content using an encryption key corresponding to a unique decryption key of a first device; a module generating unit which generates a module for determining whether the encrypted digital content has been decrypted by a second device and notifying the first device of the determined result; and a link unit which links the encrypted digital content with the module such that the module is automatically driven when the encrypted digital content is decrypted.

According to another aspect of the present invention, there is provided a computer-readable medium having embodied thereon a computer program for performing a method of managing digital content encrypted using an encryption key corresponding to a domain key shared by members of a domain, the method including recognizing that the encrypted digital content is decrypted; determining whether a device, which decrypts the encrypted digital content, is a member of the domain using a predetermined characteristic value of using a predetermined characteristic value of the device; and notifying the domain that the domain key has been externally leaked, based on the determined result.

According to another aspect of the present invention, there is provided a computer-readable medium having embodied thereon a computer program for performing a method of managing digital content encrypted using an encryption key corresponding to a unique decryption key of a first device, the method including recognizing that the encrypted digital content is decrypted; determining whether a second device, which decrypts the encrypted digital content, corresponds to the first device using a predetermined characteristic value of each of the first and second devices; and notifying the first device that the domain key has been externally leaked, based on the determined result.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
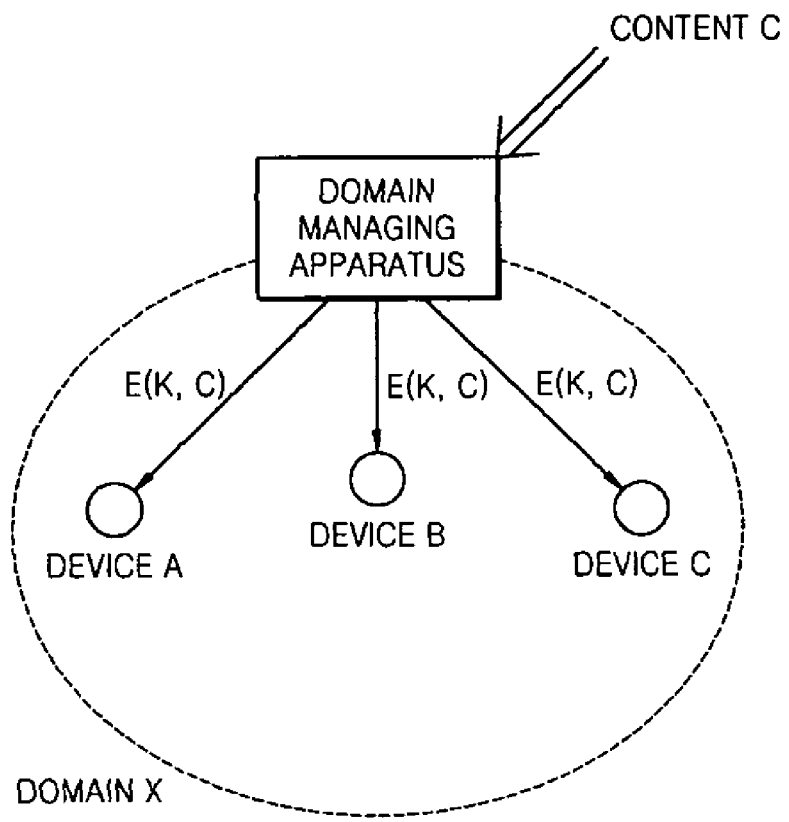
FIG. 1 is a view for illustrating a method of managing digital content in a general domain.
Figure 2:
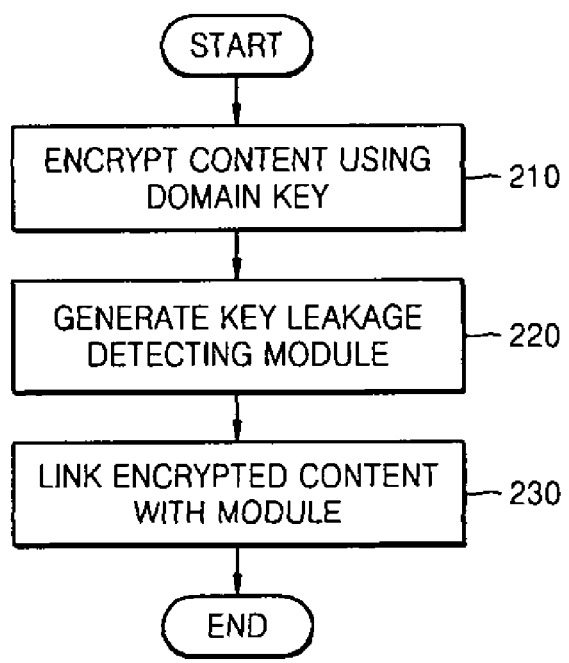
FIG. 2 is a flowchart schematically illustrating a method of managing digital content in a domain managing apparatus according to an exemplary embodiment of the present invention.

FIG. 2 is a flowchart schematically illustrating a method of managing digital content in a domain managing apparatus according to an exemplary embodiment of the present invention.

First, when digital content is input to a domain, the domain managing apparatus according to the present exemplary embodiment encrypts the digital content using a domain key (operation 210). In the present exemplary embodiment, it is assumed that the domain key is a symmetric key. Thus, devices registered in the domain and having the domain key can decrypt the encrypted content.

After encrypting the digital content, a key leakage detecting module is generated (operation 220). When the digital content encrypted in operation 210 is decrypted, the key leakage detecting module detects whether a device which decrypts the digital content is a member of the domain and notifies the domain managing apparatus of the detected result such that the domain managing apparatus can change the domain key if the domain key is leaked. The key leakage detecting module will be described later.

When the key leakage detecting module is generated, the domain managing apparatus stores information linking the key leakage detecting module to the encrypted digital content (operation 230) such that the key leakage detecting module is automatically driven to determine whether a device which decrypts the digital content is a member of the domain when the encrypted digital content is decrypted.

Figure 3:
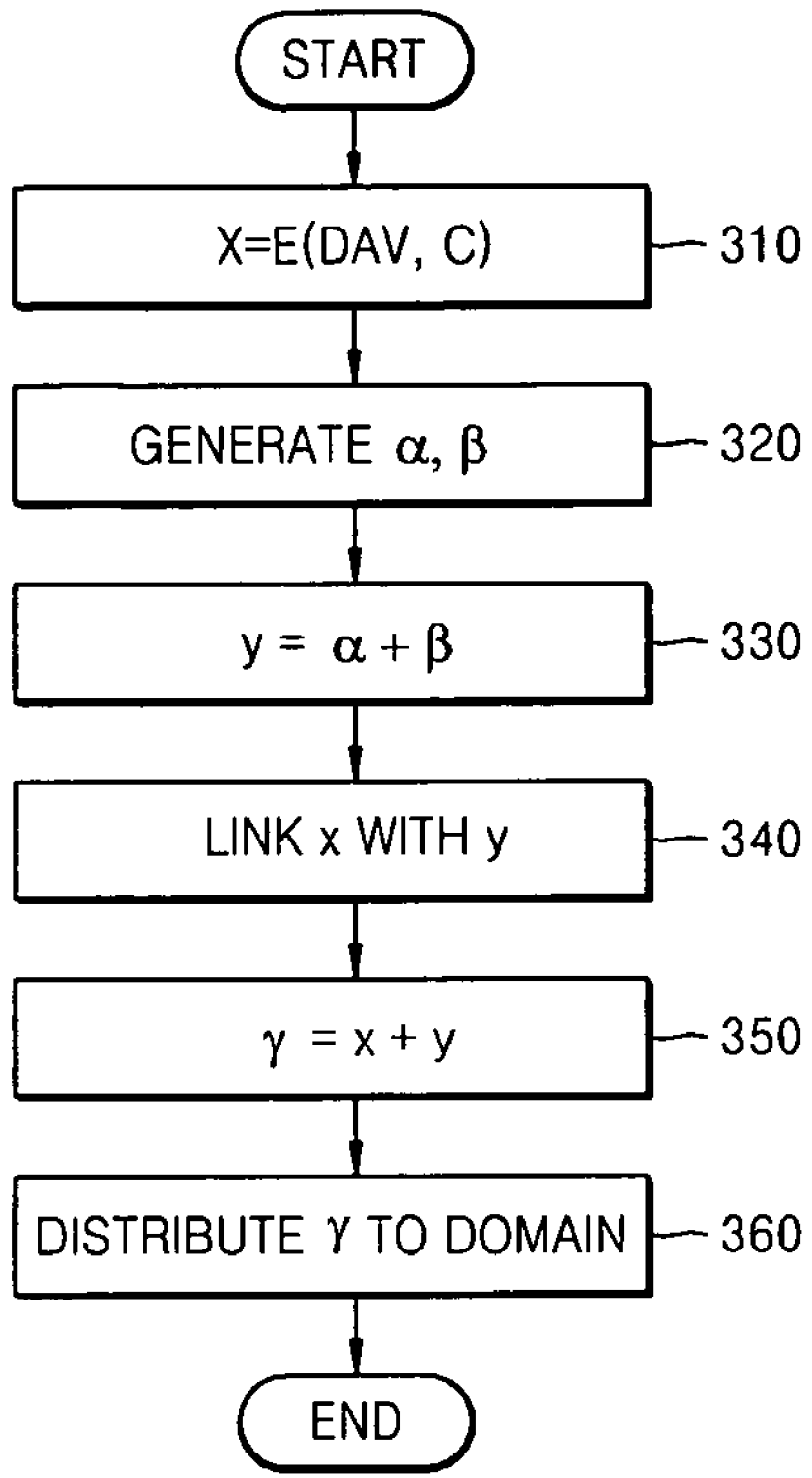
FIG. 3 is a flowchart illustrating in detail a method of managing digital contents in a domain managing apparatus according to an exemplary embodiment of the present invention.

FIG. 3 is a flowchart illustrating in detail a method of managing digital content in a domain managing apparatus according to an exemplary embodiment of the present invention.

The domain managing apparatus encrypts digital content C using an encryption key DAV which can be decrypted only by a domain key (operation 310). After the digital content is encrypted C, key leakage detecting data $\alpha$ and a key leakage detecting program $\beta$ are generated (operation 320) and packaged to generate a key leakage detecting module y (operation 330). The key leakage detecting data $\alpha$ includes information on the members of the domain and used for determining whether devices are members of the domain. When the encrypted digital content is decrypted, the key leakage detecting program $\beta$ extracts a characteristic value $\delta$ from a device which decrypts the digital content and determines whether the device is a member of the domain based on the key leakage detecting data $\alpha$ and the characteristic value $\delta$. Here, the key leakage detecting data $\alpha$ and the characteristic value $\delta$ are not limited to specific data. For example, the key leakage detecting data $\alpha$ may be a set of public keys of devices registered in the domain and the characteristic value $\delta$ may be a public key of a device which decrypts the content. In this case, the key leakage detecting program β determines whether the characteristic value δ is included in the key leakage detecting data α.

Next, the domain managing apparatus links the encrypted content x with the key leakage detecting module y (operation 340). The encrypted content x is linked with the key leakage detecting module y in order to automatically drive the key leakage detecting module when the encrypted digital content is decrypted. The encrypted content x and the key leakage detecting module y are then packaged to generate γ (operation 350) which is then distributed to the members of the domain (operation 360).

Although, in the present exemplary embodiment, γ is generated by packaging the encrypted content x and the key leakage detecting module y and γ is distributed to the domain, the encrypted content x does not necessarily need to be packaged and distributed with the key leakage detecting module y. Since the encrypted content x is already linked with the key leakage detecting module y, only the encrypted content x may be distributed without the key leakage detecting module y since the key leakage detecting module y is when the digital content is decrypted.

Figure 4:
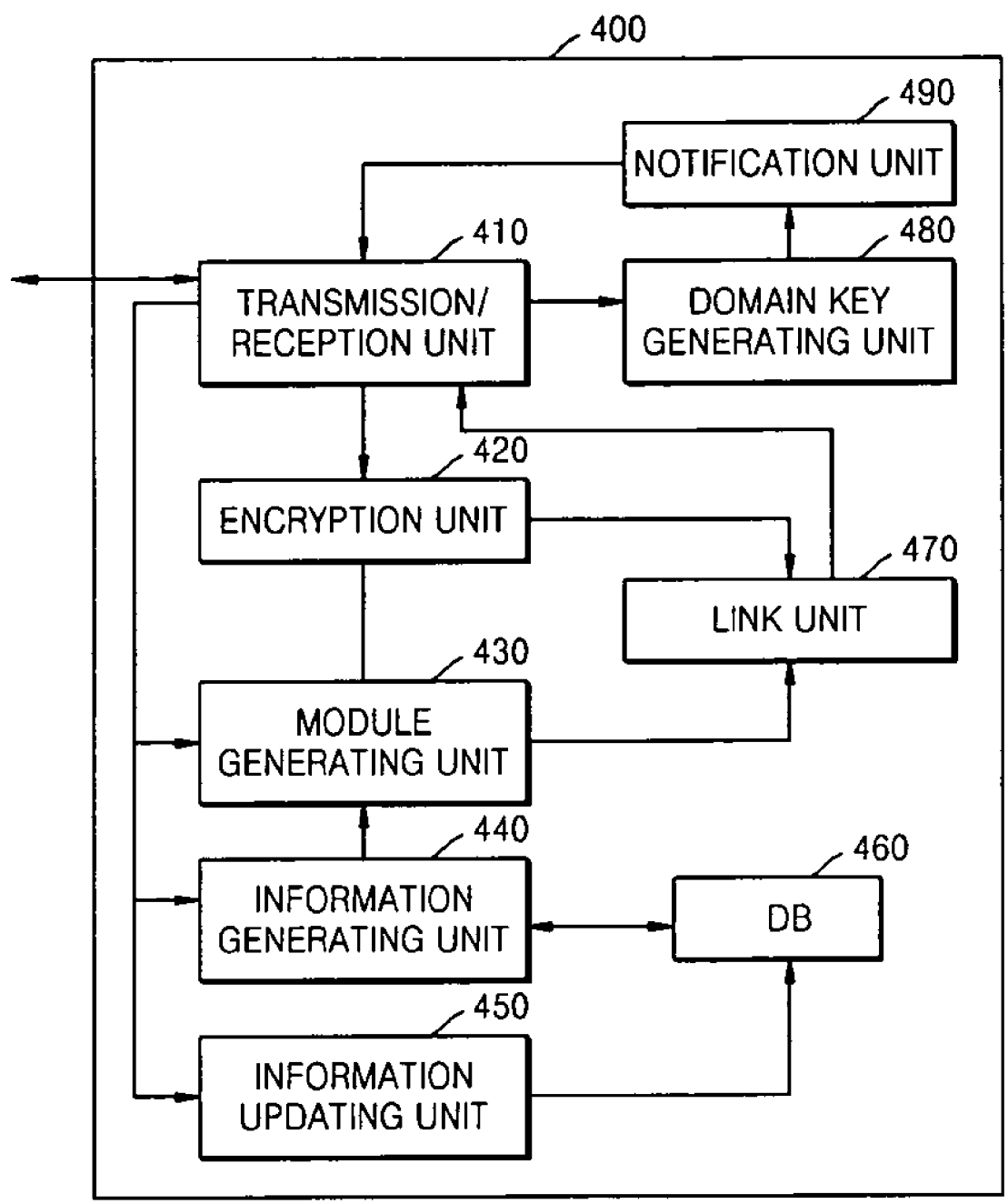
FIG. 4 illustrates a configuration of a domain managing apparatus according to an exemplary embodiment of the present invention.

FIG. 4 illustrates a configuration of a domain managing apparatus 400 according to an exemplary embodiment of the present invention.

As illustrated in FIG. 4, the domain managing apparatus 400 according to the present exemplary embodiment includes a transmission/reception unit 410, an encryption unit 420, a module generating unit 430, an information generating unit 440, an information updating unit 450, a database 460, a link unit 470, a domain key generating unit 480, and a notification unit 490.

The transmission/reception unit 410 is a communication interface for allowing the domain managing apparatus 400 to transmit data to and receive data from an external device. The encryption unit 420 encrypts digital content using an encryption key corresponding to a domain key, when the digital content is received from the external device through the transmission/reception unit 410. The module generating unit 430 generates a key leakage detecting module of the received digital content. The information generating unit 440 generates key leakage detecting data α which is information on devices registered in the domain, stores the key leakage detecting data α in the database 460, and provides the key leakage detecting data α to the module generating unit 430 for generating the key leakage detecting module. The information updating unit 450 updates the key leakage detecting data α when one of the members of the domain is changed, that is, when a device is newly registered in the domain or a registered device is deleted from the domain.

The link unit 470 links the encrypted digital content with the key leakage detecting module, packages the encrypted digital content and the key leakage detecting module, and distributes the encrypted digital content and the key leakage detecting module to the members of the domain through the transmission/reception unit 410.

When the key leakage detecting module of the distributed digital content operates and detects that the digital content is decrypted by a device which is not a valid member of the domain, the key leakage detecting module notifies the domain managing apparatus 400 that the encryption key has been leaked. In response, the domain key generating unit 480 discards the existing domain key and generates a new domain key, and the notification unit 490 notifies the members of the domain of the new domain key through the transmission/reception unit 410. In this case, the encryption unit 420 encrypts digital content which will be received later using an encryption key corresponding to the new domain key.

Figure 5:
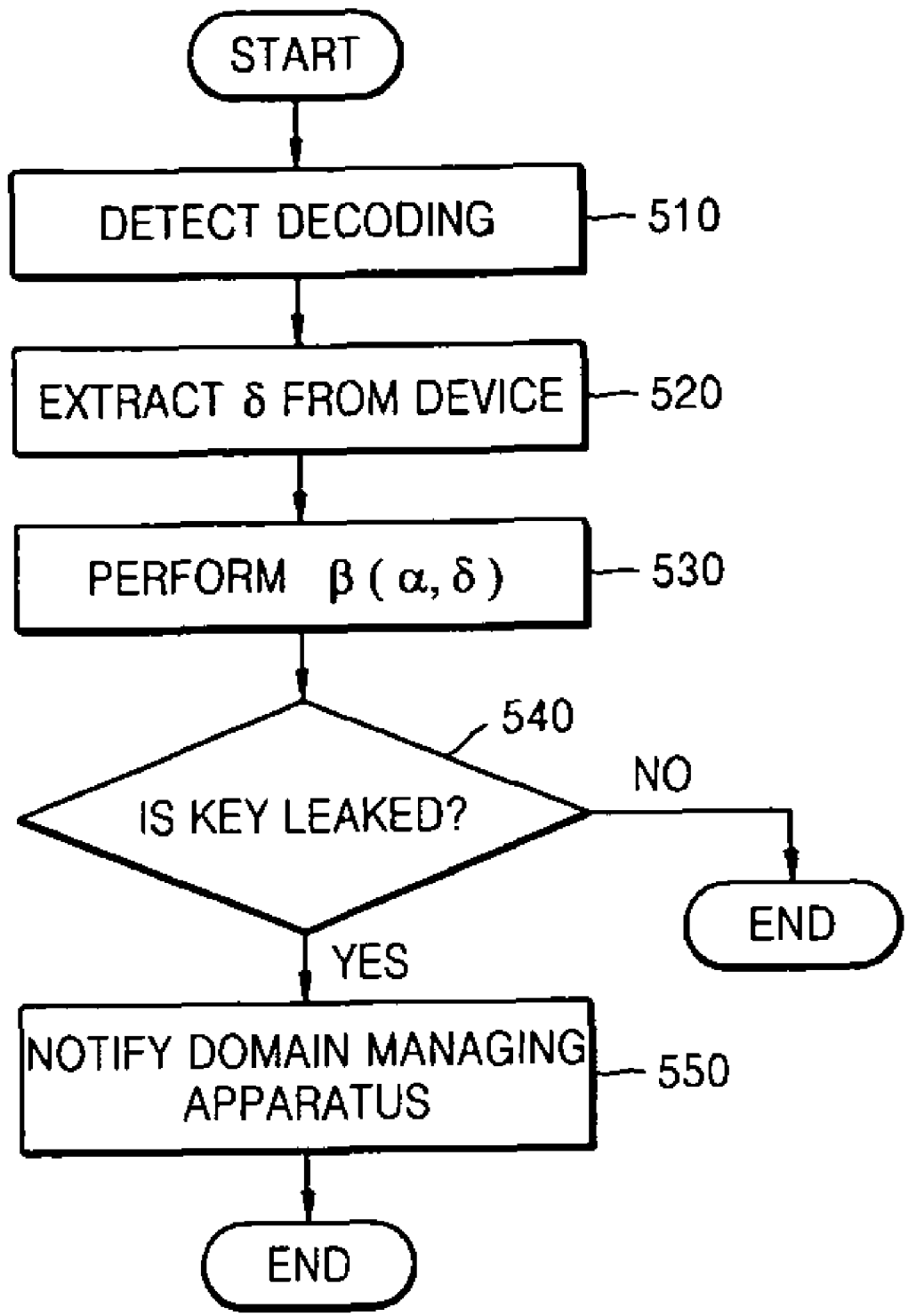
FIG. 5 is a flowchart illustrating an operation of a key leakage detecting module according to an exemplary embodiment of the present invention.

FIG. 5 is a flowchart illustrating an operation of a key leakage detecting module y according to an exemplary embodiment of the present invention. The key leakage detecting module y includes a key leakage detecting program β and key leakage detecting data α. The key leakage detecting program β detects that linked digital content is decrypted (operation 510) and extracts a characteristic value δ from a device which decrypts the digital content (operation 520). In addition, it is determined whether the device is a member of the domain (operation 540) using the key leakage detecting data α and the characteristic value δ of the device as input values (operation 530). If it is determined that the device is a member of the domain, the domain managing apparatus is notified that the encryption key is leaked (operation 550). Since the key leakage detecting module performs the above process, the domain managing apparatus 400 can be notified that the encryption key is leaked.

Figure 6:
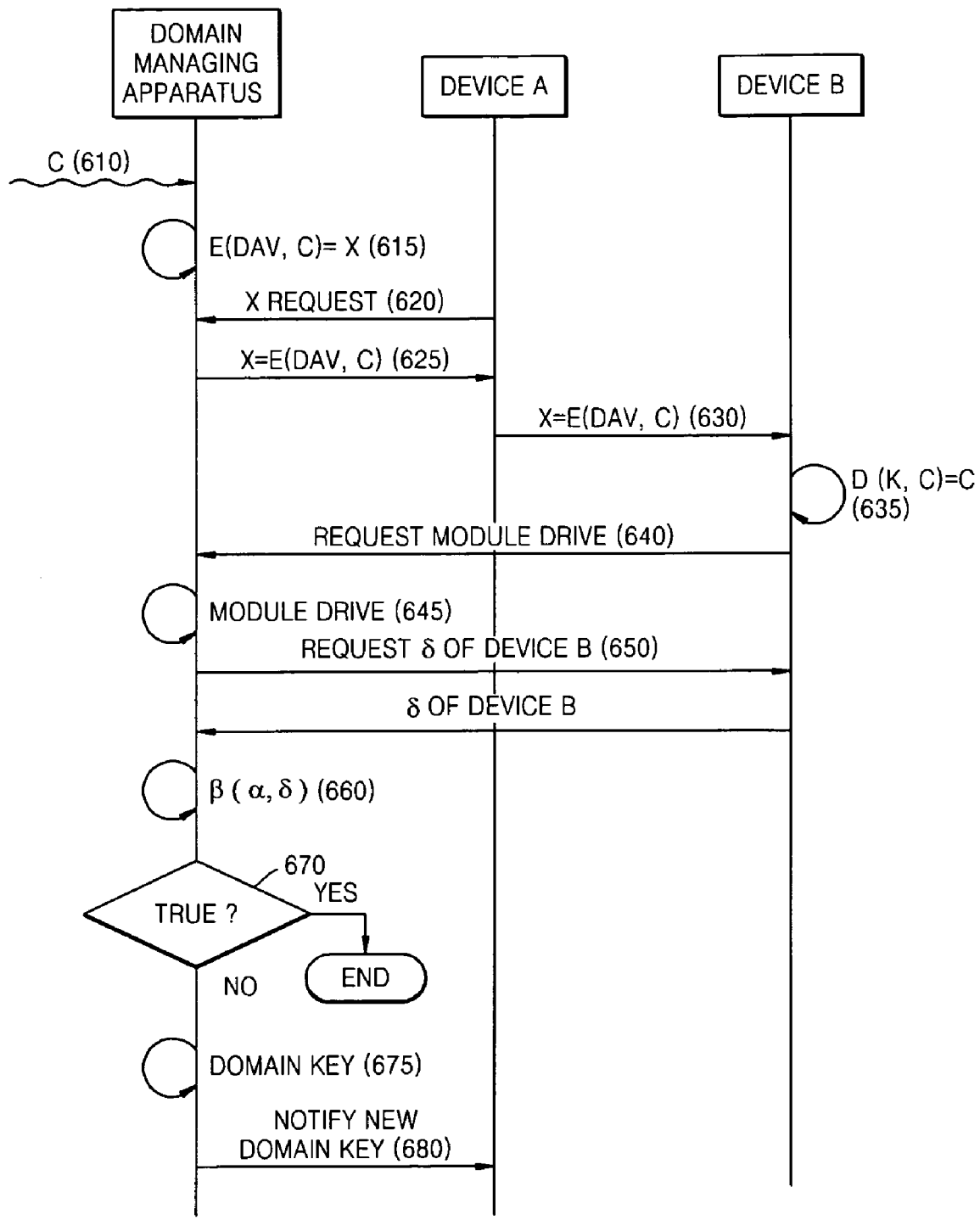
FIG. 6 is a flowchart illustrating a process of detecting that a digital content encryption key has been leaked, according to an exemplary embodiment of the present invention.

FIG. 6 is a flowchart illustrating a process of detecting that an encryption key DAV of digital content C has been leaked, according to an exemplary embodiment of the present invention.

When the digital content C is input to a domain (operation 610), a domain managing apparatus generates data x obtained by encrypting the digital content C using the encryption key DAV corresponding to a domain key (operation 615). In response to a request of a device A registered in the domain, the domain managing apparatus transmits the data x to the device A (operation 620), and the device A then transmits the data x to a device B through any path (operation 630). Here, it is assumed that a device B is not registered in the same domain as that of the device A.

The device B must follow compliance rules of the DRM system in order to decrypt the digital content C. That is, if the device B has a DRM module in it, the device B has to check the module when it decrypts content. On the other hand, if there is no module in it, the device B will ask the domain managing apparatus according to the compliance rule. When the device B decrypts digital content C using a decryption key k (operation 635), the key leakage module operates by using link information generated when the key leakage detecting module is linked with the data x (operations 640 and 645). A key leakage detecting program β, which detects that the digital content C has been decrypted, extracts a characteristic value δ of the device B (operations 650 and 655), and determines whether the device B is a valid member of the domain using the key leakage detecting data α and the characteristic value δ (operation 660). If it is determined that the device B is not a valid member of the domain (operation 670), the key leakage detecting program β notifies the domain managing apparatus of the determined result. The domain managing apparatus, which knows that the digital content C is decrypted by a device which is not a valid member of the domain, updates the domain key (operation 675) and notifies the device A of the updated domain key (operation 680). Accordingly, the domain managing apparatus encrypts digital content which will be distributed to the domain later using an encryption key corresponding to the updated domain key.

Figure 7:
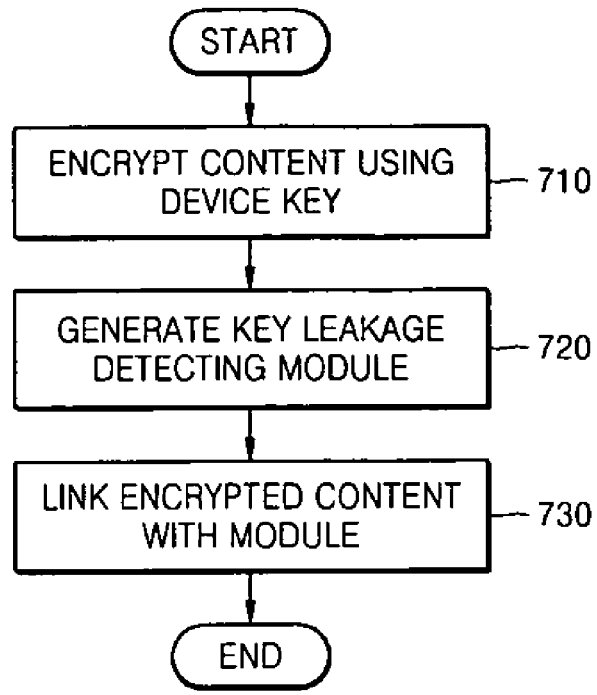
FIG. 7 is a flowchart illustrating a method of managing digital content according to another exemplary embodiment of the present invention.

FIG. 7 is a flowchart illustrating a method of managing digital content according to another exemplary embodiment of the present invention. In the present exemplary embodiment, it is assumed that a general digital content managing apparatus manages digital content which must not be decrypted by another device regardless of a domain.

The digital content managing apparatus encrypts digital content using a device key (operation 710). Here, the device key is a unique encryption key of an encryption device and is used for encrypting the digital content such that only the encryption device can decrypt the digital content. In a public key infrastructure, since a device has its own private key, the device key is a public key of the device. Alternatively, the device key may be a symmetric key.

When the encryption is finished, a key leakage detecting module is generated (operation 720). Here, the key leakage detecting module includes key leakage detecting data and a key leakage detecting program, extracts a characteristic value of a device for decryption the encrypted content, and determines whether the device is an authorized device, i.e., a member of the domain. Here, the characteristic value of the device is not specified and may be, for example, a public key of the device.

When the key leakage detecting module is generated, the digital content managing apparatus has link information on the encrypted digital content (operation 730) such that the module is automatically driven to determine whether a device which decrypts the content is a member of the domain when the encrypted digital content is decrypted.

Figure 8:
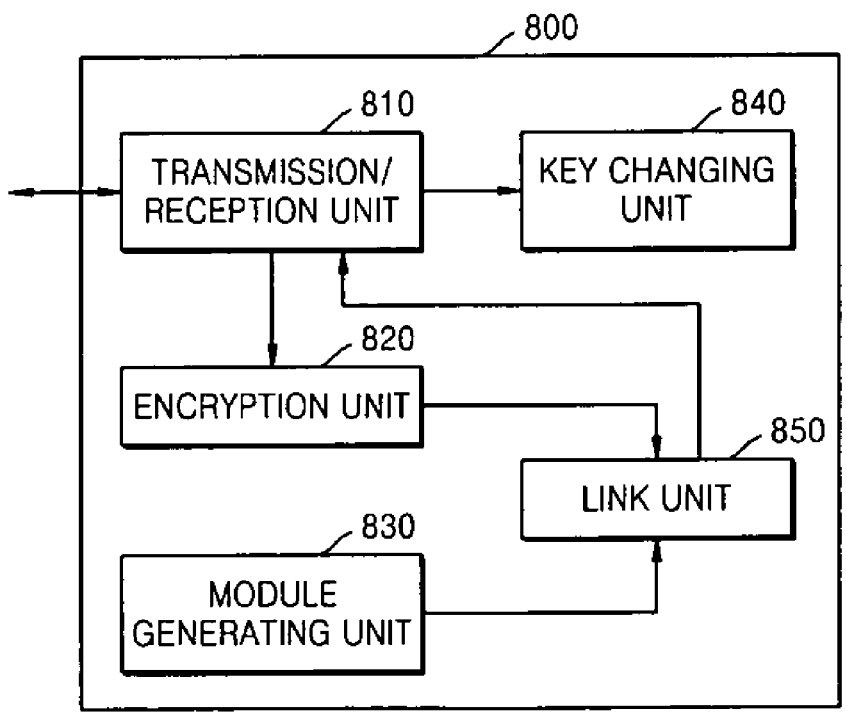
FIG. 8 illustrates a configuration of a digital content managing apparatus according to another exemplary embodiment of the present invention.

FIG. 8 illustrates a configuration of a digital content managing apparatus 800 according to another exemplary embodiment of the present invention. In the present exemplary embodiment, it is assumed that the digital content managing apparatus 800 is an individual device which does not belong to a domain.

As illustrated in FIG. 8, the digital content managing apparatus 800 according to the present exemplary embodiment includes a transmission/reception unit 810, an encryption unit 820, a module generating unit 830, a key changing unit 840, and a link unit 850.

The transmission/reception unit 810 is a communication interface through which the content managing apparatus 800 transmits data to and receives data from an external device. The encryption unit 820 encrypts digital content using a device key when the digital content is received from the external device through the transmission/reception unit 810. The module generating unit 830 generates a key leakage detecting module of the received digital content, and the link unit 850 links the encrypted digital content with the key leakage detecting module.

When the encrypted digital content is externally transmitted and the key leakage detecting module then operates such that it is notified that the encryption key is leaked, the key changing unit 840 discards the existing device key and generates a new device key. Thus, the encryption unit 820 can encrypt digital content to be received later using the new device key.

The exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs).

According to the present invention, when an encryption key used for encrypting digital content is leaked or cracked, a digital content managing apparatus for encrypting the digital content is automatically notified that the encryption key is leaked to allow the encryption key to be changed. Thus, it is possible to prevent the digital content from being continuously leaked due to the use of the same encryption key for encrypting subsequent digital content.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of managing digital content, the method comprising:
    determining whether encrypted digital content, which can be decrypted by a first domain key shared by devices which are members of a domain, has been decrypted by a device which is not a member of the domain;
    generating a second domain key if it is determined that the encrypted digital content has been decrypted by a device which is not a member of the domain;
    notifying the members of the domain the second domain key;
    generating a module which is operable to determine whether the encrypted digital content has been decrypted by a device which is not a member of the domain; and
    linking the encrypted digital content with the module such that the module is driven if the encrypted digital content is decrypted,
    wherein the determining whether encrypted digital content has been decrypted by a device which is not a member of the domain is performed by the module, and
    wherein at least one of the determining, the generating, and the notifying is performed by processor within a domain managing apparatus.

2. The method of claim 1, wherein each of the first and second domain keys is a symmetric key.

3. The method of claim 1, wherein the module determines whether the encrypted digital content has been decrypted by a device which is not a member of the domain with reference to information on the members of the domain.

4. The method of claim 3, wherein the information comprises public keys of the members of the domain, and the module compares the information with a public key of the device which decrypted the encrypted content.

5. The method of claim 3, further comprising updating the information if one of the members of the domain is changes.

6. A non-transitory computer-readable recording medium having embodied thereon a computer program for performing a method of managing digital content, the method comprising:
    determining whether encrypted digital content, which can be decrypted by a first domain key shared by devices which are members of a domain, has been decrypted by a device which is not a member of the domain;
    generating a second domain key if it is determined that the encrypted digital content has been decrypted by a device which is not a member of the domain;
    providing the second domain key to the members of the domain;
    generating a module which is operable to determine whether the encrypted digital content has been decrypted by a device which is not a member of the domain; and
    linking the encrypted digital content with the module such that the module is driven if the encrypted digital content is decrypted,
    wherein the determining whether encrypted digital content has been decrypted by a device which is not a member of the domain is performed by the module.

7. An apparatus for managing digital content, the apparatus comprising:
an encryption device which encrypts digital content such that the encrypted digital content can be decrypted only by a first domain key which is shared by devices which are members of a domain;
a domain key generating device which generates a second domain key if it is notified that the encrypted digital content has been decrypted by a device which is not a member of the domain;
a notification device which notifies the members of the domain of the second domain key;
a module generating device which generates a module which determines whether the encrypted digital content has been decrypted by a device which is not a member of the domain;
a link device which links the encrypted digital content with the module such that the module is driven if the encrypted digital content is decrypted; and
an information generating device which generates information on the members of the domain,
wherein the module determines whether the encrypted digital content is decrypted by a device which is not a member of the domain with reference to the information, and
wherein at least one of the encryption device, the domain key generating device, and the notification device, is embodied by a tangible component of the apparatus, and comprises a processor.

8. The apparatus of claim 7, wherein each of the first and second domain keys is a symmetric key.

9. The apparatus of claim 7, wherein the information comprises public keys of the members of the domain, and the module compares the information with a public key of the device which decrypted the encrypted digital content.

10. The apparatus of claim 7, further comprising an information updating unit which updates the information if one of the members of the domain changes.

11. A method of managing digital content, the method comprising:
encrypting digital content at a first device, using an encryption key corresponding to a decryption key of the first device;
generating a module which determines whether the encrypted digital content has been decrypted by a second device and notifies the first device of a determined result; and
linking, at the first device, the encrypted digital content with the module such that the module is driven if the encrypted digital content is decrypted.

12. The method of claim 11, further comprising:
changing a value of the encryption key if the module determines that the encrypted digital content has been decrypted by the second device.

13. The method of claim 11, wherein the module determines whether the encrypted digital content has been decrypted by the second device with reference to a predetermined characteristic value of the first device.

14. The method of claim 13, wherein the characteristic value is a public key of the first device, and the module compares the public key of the second device with the characteristic value.

15. A computer-readable recording medium having embodied thereon a computer program for performing a method of managing digital content, the method comprising:
encrypting digital content at a first device, using an encryption key corresponding to a decryption key of the first device;
generating a module which determines whether the encrypted digital content has been decrypted by a second device and notifies the first device of a determined result; and
linking, at the first device, the encrypted digital content with the module such that the module is driven if the encrypted digital content is decrypted.

16. An apparatus for managing digital content, the apparatus comprising:
an encryption unit which encrypts digital content using an encryption key corresponding to a unique decryption key of a first device;
a module generating unit which generates a module which determines whether the encrypted digital content has been decrypted by a second device and notifies the first device of a determined result; and
a link unit which links the encrypted digital content with the module such that the module is driven if the encrypted digital content is decrypted,
wherein at least one of the encryption unit, the module generating unit, and the link unit, is embodied by a tangible component of the apparatus, and comprises a processor.

17. The apparatus of claim 16, further comprising:
a key changing unit which changes a value of the encryption key if the module notifies the first device that the encrypted digital content has been decrypted by the second device.

18. The apparatus of claim 16, wherein the module determines whether the encrypted digital content has been decrypted by the second device with reference to a predetermined characteristic value of the first device.

19. The apparatus of claim 18, wherein the characteristic value is a public key of the first device, and the module compares the public key of the second device with the characteristic value.

20. A non-transitory computer-readable recording medium having embodied thereon a computer program for performing a method of managing digital content encrypted using an encryption key corresponding to a domain key shared by devices which are valid members of a domain, the method comprising:
detecting that the encrypted digital content is decrypted;
determining whether a device, which decrypts the encrypted digital content, is a member of the domain using a predetermined characteristic value;
notifying that the domain key has been externally leaked, based on a result of the determining;
generating a module which is operable to determine whether the encrypted digital content has been decrypted by a device which is not a member of the domain; and
linking the encrypted digital content with the module such that the module is driven if the encrypted digital content is decrypted,
wherein the determining is performed by the module.

21. A non-transitory computer-readable recording medium having embodied thereon a computer program for performing a method of managing digital content encrypted using an encryption key corresponding to a unique decryption key of a first device, the method comprising:
- detecting that the encrypted digital content is decrypted;
- determining whether a second device, which decrypts the encrypted digital content, corresponds to the first device using a predetermined characteristic value of each of the first and second devices;
- notifying the first device that the domain key has been externally leaked, based on a result of the determining;
- generating a module which is operable to determine whether the second device corresponds to the first device; and
- linking the encrypted digital content with the module such that the module is driven if the encrypted digital content is decrypted, wherein the determining is performed by the module.

* * * * *